United States Patent
Zott et al.

(10) Patent No.: US 8,432,770 B2
(45) Date of Patent: Apr. 30, 2013

(54) METHOD AND DEVICE FOR DETECTING THE SURFACE CHARACTER OF OBJECTS IN ROAD TRAFFIC OR OF PERSONS

(75) Inventors: Christian Zott, Bietigheim-Bissingen (DE); Soenke Carstens-Behrens, Bonn (DE); Claudia Zehder, Pfullingen (DE); Jacek Kaminski, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 562 days.

(21) Appl. No.: 11/918,848

(22) PCT Filed: Mar. 23, 2006

(86) PCT No.: PCT/EP2006/061015
§ 371 (c)(1),
(2), (4) Date: Mar. 2, 2009

(87) PCT Pub. No.: WO2006/120057
PCT Pub. Date: Nov. 16, 2006

(65) Prior Publication Data
US 2009/0213694 A1    Aug. 27, 2009

(30) Foreign Application Priority Data
May 9, 2005 (DE) .......................... 10 2005 021 225

(51) Int. Cl.
*G01S 15/93* (2006.01)
*G01S 7/539* (2006.01)
*G01S 7/41* (2006.01)

(52) U.S. Cl.
USPC ................. 367/95; 367/909; 340/436

(58) Field of Classification Search ............... 367/95, 367/96, 909; 340/435, 436; 701/301
See application file for complete search history.

(56) References Cited

U.S. PATENT DOCUMENTS

| | | | | |
|---|---|---|---|---|
| 4,260,980 A | * | 4/1981 | Bates | 367/909 |
| 4,920,520 A | * | 4/1990 | Gobel et al. | 367/909 |
| 6,173,233 B1 | * | 1/2001 | Janutka et al. | 701/301 |
| 6,268,803 B1 | * | 7/2001 | Gunderson et al. | 340/436 |
| 6,384,718 B1 | * | 5/2002 | Nass et al. | 340/435 |
| 6,615,138 B1 | * | 9/2003 | Schiffmann et al. | 701/301 |
| 2004/0140927 A1 | | 7/2004 | Meinecke | |

FOREIGN PATENT DOCUMENTS

| | | |
|---|---|---|
| DE | 100 25 678 | 12/2001 |
| DE | 101 16 277 | 10/2002 |
| DE | 102 60 434 | 7/2004 |
| DE | 103 27 115 | 11/2004 |
| DE | 103 34 699 | 2/2005 |
| DE | 103 44 299 | 4/2005 |

* cited by examiner

Primary Examiner — Ian Lobo
(74) Attorney, Agent, or Firm — Kenyon & Kenyon LLP

(57) ABSTRACT

A method for detecting the surface character of objects in road traffic or of persons, especially pedestrians, vehicles, obstacles and the like, in which signals are emitted from a vehicle that are reflected by a person or an object, and in which the reflected signals are received and evaluated in the vehicle, wherein the emitted signals are transmit pulses whose echo pulses are received, and based on the signal characteristics of the echo pulses, the surface character is inferred, and from that, it is inferred whether a person or an object is positioned in front of the vehicle.

20 Claims, 2 Drawing Sheets

METHOD AND DEVICE FOR DETECTING THE SURFACE CHARACTER OF OBJECTS IN ROAD TRAFFIC OR OF PERSONS

FIELD OF THE INVENTION

The present invention relates to a method and a device for detecting the surface character of objects in road traffic or of persons, as well as the utilization of such a method in vehicles.

BACKGROUND INFORMATION

A crucial point in the development of today's and future vehicle systems is the increase of safety in road traffic. In addition to increasing the safety for vehicle occupants, this also involves increasing the safety for other road users, especially pedestrians or cyclists in road traffic. Therefore, the protection of pedestrians and cyclists in road traffic will find special consideration in future legislative proposals.

From the related art, there are sensors and evaluation devices which record the impact of objects on a vehicle and control the deployment of airbags to protect the vehicle occupants. Sensors of this type detect a deformation, or also a very great acceleration of the front or side sections of a vehicle. The disadvantage of such devices is that it is difficult to distinguish between persons and objects, thus, e.g., vehicles, obstacles or the like. Another disadvantage is that persons or objects are first detected and classified very late, so that there may not be sufficient time available for initiating protective measures.

Furthermore, so-called precrash detection systems for detecting road users and obstacles are known from the related art. For example, the German Patent DE 100 25 678 A1 discusses a method and a device for detecting road users and obstacles based on camera images for determining their distance from the observer and their classification. In so doing, potential opposing parties in an accident are recognized and identified in a two-step classification. The distance and the speed of the potential opposing party is estimated, and the road user is classified on this basis.

The German Patent DE 102 60 434 A1 discusses a method which measures the length of objects in front of a vehicle with the aid of radar sensors. On the basis of this linear measurement, the objects are classified and, based on that, for example, the mass of the objects is estimated.

Sensor systems based on cameras or radar sensors require complicated implementation and high costs associated with it.

So-called parking-aid assistants are also known, which determine the distance between a vehicle and an obstacle with the aid of an ultrasonic sensor system, and output warning signals to the driver of the vehicle if there is a drop below a specifiable threshold.

SUMMARY OF THE INVENTION

An object of the present invention is to introduce a method and a device for detecting the surface character of objects in road traffic or of persons, which is able to be carried out and implemented in an inexpensive and uncomplicated manner.

This objective may be achieved by the features described herein.

An idea of the present invention is that, based on the knowledge of the character of the surface of a road-traffic object or of a person, to classify the object or this person and in this way, for example, to distinguish persons from objects. To that end, according to the present invention, transmit pulses are emitted from the vehicle, are reflected by the person or the object, the characteristics of the echo pulses received are evaluated, and from this, the surface character of the object or the person is inferred.

Advantageous developments and further refinements of the present invention are described herein.

Thus, the following signal characteristics may be evaluated, and the classification is carried out on this basis:

pulse length of a received echo pulse;

average pulse length of a specifiable number of previous echo pulses from the same person or the same object;

fluctuation of the pulse length of a specifiable number of previous echo pulses from the same person or the same object;

number of echo pulses within a specifiable time interval beginning from the first echo pulse received;

change of the signal shape as a function of the specific distance of the person or object from the vehicle.

Different algorithms may be used for the evaluation. For example, the individual features are used separately as classifiers, and their results are logically combined. Moreover, LDA methods, neural networks, support vector machines (SVM) or the like may also be used.

Ultrasonic signals may be used particularly advantageously in this connection. In this case, pulse-echo sensors may be used which, for instance, are part of an ultrasonic-sensor array as used in parking-aid assistants known per se.

Further advantages and features of the present invention are the subject matter of the following description as well as the illustrative representations of an exemplary embodiment of the invention, as described herein.

DETAILED DESCRIPTION

Figure 4:
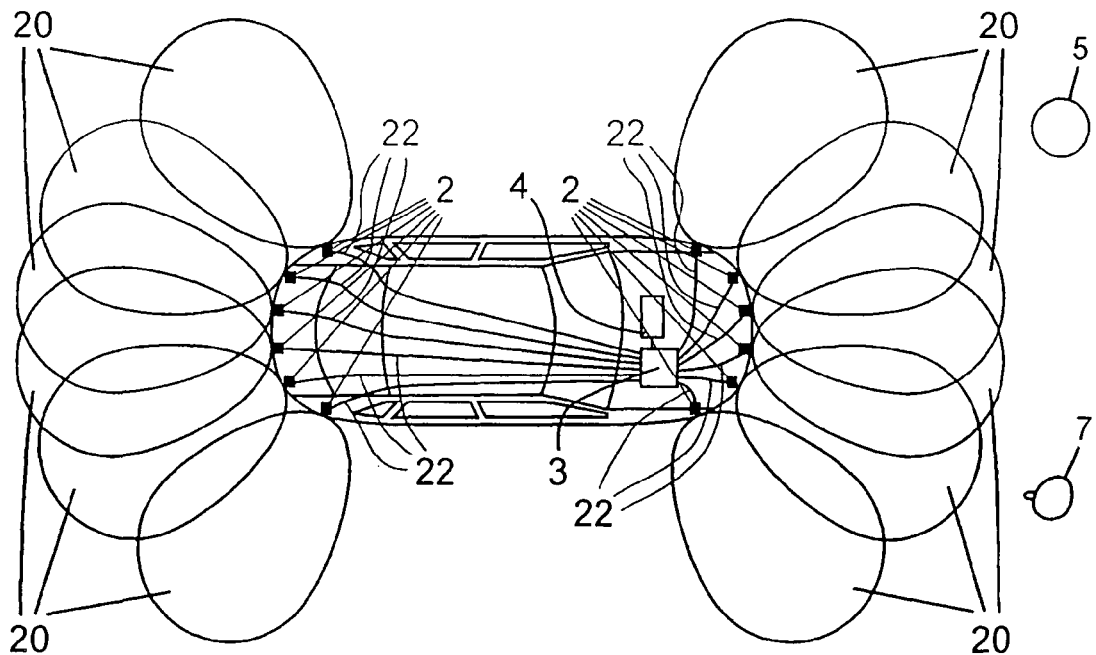
FIG. 4 shows schematically a device, disposed in a vehicle, for determining the surface character of persons or objects in road traffic.

A device, shown in FIG. 4, for detecting the surface character of objects or persons in road traffic, e.g., a pedestrian 7 or a delineator 5 which are located in the front area of a vehicle 1, includes one or more pulse-echo sensors 2, especially one sensor array each in the front section and the rear section of vehicle 1. Pulse-echo sensors 2 emit ultrasonic signals 20 in the form of transmit pulses. These transmit pulses are reflected, for example, by person 7 or delineator 5 and are received in the vehicle by pulse-echo sensors 2. Sensors 2 are connected via signal lines 22 to a signal-analysis device 3 which evaluates the received signals and, as a function of the evaluation, controls at least one control device 4 of vehicle 1, for example, for setting and adjusting the operating dynamics of vehicle 1 and/or for triggering protective devices, especially occupant protective devices or pedestrian protective devices of vehicle 1.

For example, the ultrasonic sensor arrays known from parking-aid assistants may be used as sensor arrays, which ascertain the distance of an object 5 from the vehicle to thus give warning signs to the driver to avoid collisions with object 5.

According to the present invention, these ultrasonic sensors 2 are now used for detecting the surface character of a person 7 or an object, e.g., delineator 5, located in front of the vehicle.

Ultrasonic sensors of this kind have two levels (high, low). For example, a change from high to low indicates the beginning of a received pulse, the subsequent change from low to high, its end. The time during which the level is at low may be measured as pulse duration. Based on the travel-time measurement from transmission to reception, the distance of the vehicle to the object is determined in a generally known parking-aid assistant.

The present invention now utilizes the signal characteristics of such echo pulses in order to draw conclusions from them about the surface character of a person 7 or an object 5 located in the influence range of sensors 2 of the vehicle. In this context, features which are obtained from the sensor signal are utilized for the classification. They are:

the pulse length of an instantaneous echo signal;
the average pulse length of a predefined number of previous echo signals from the same person 7 or same object 5;
the fluctuation of the pulse length of a predefined number of previous echo signals from the same person 7 or same object 5, the variance and/or the standard deviation being considered here in particular;
the number of pulses within a predefined interval calculated from the first echo of person 7 or object 5;
the dependency of the previous features on the specific distance of person 7 or object 5 to the sensor; and
the fluctuations obtained in a tracking of the distance data of person 7 or object 5.

Various algorithms may be used for the classification. In the simplest case, the individual features are used separately as classifiers, and their results are logically combined, e.g., by AND/OR gates. Alternatively, LDA methods, neural networks or SVM may also be used. Depending on the surface character recognized in this way, operating-dynamics systems of vehicle 1 may be set or adjusted, and/or protective devices for vehicle occupants or perhaps pedestrian protective devices, for instance, may be triggered. Thus, for example, upon detection of a person 7 in the area of vehicle 1, an exterior airbag may be deployed.

In the following, the method of the present invention and its use in motor vehicles 1 is explained in greater detail based on the signal characteristics of ultrasonic sensors as used in parking-aid assistants.

Figure 1:
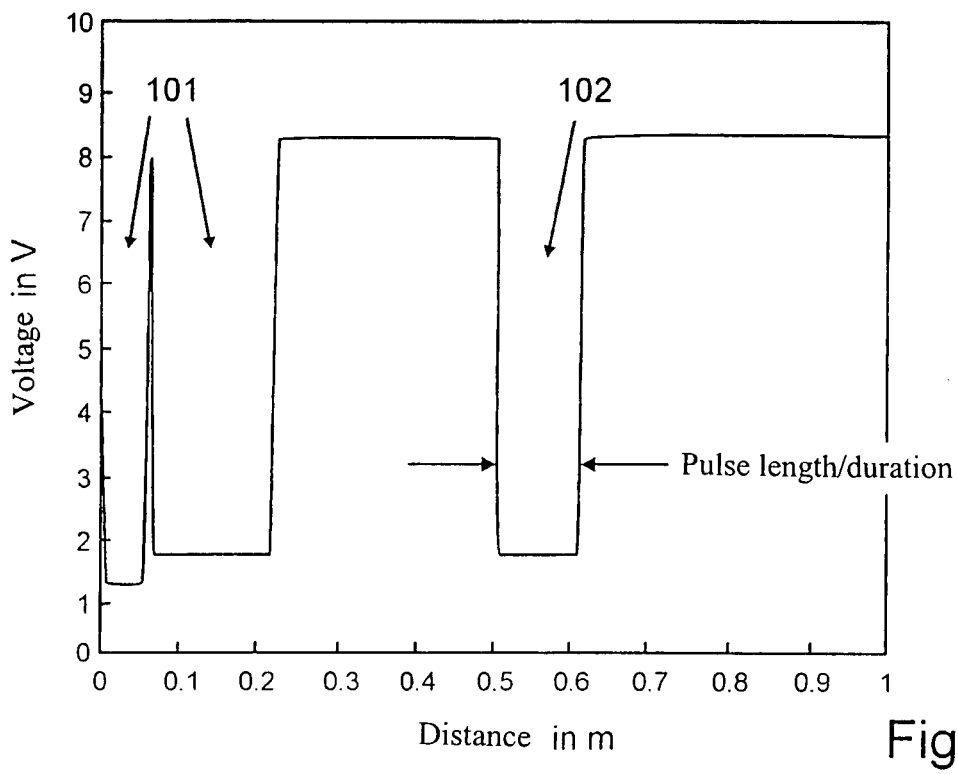
FIG. 1 shows schematically a signal of an ultrasonic sensor with transmit pulse and receive pulse of a so-called parking-aid assistant.

FIG. 1 shows a transmit pulse 101 with decay phase as well as an echo pulse 102. In this case, the voltage of the signals output by an ultrasonic sensor 2 is shown over the distance. As customary in parking-aid assistants, from the echo delay time it is possible, in a manner known per se, to determine the distance of vehicle 1 to person 7 or object 5.

Figure 2:
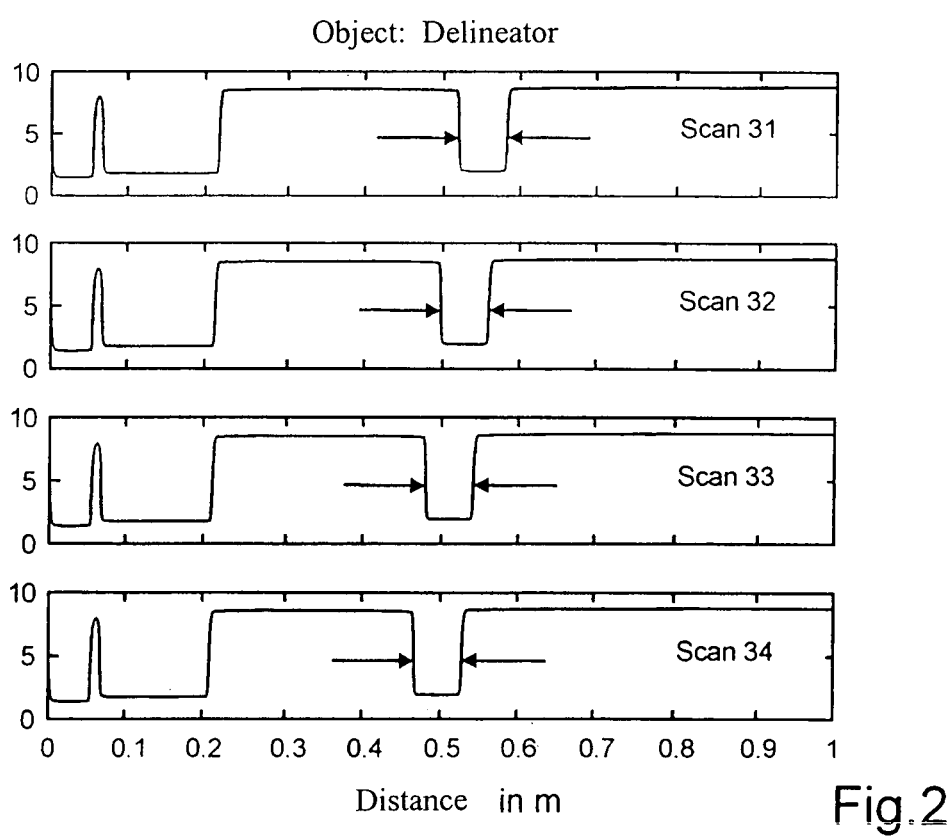
FIG. 2 shows a sequence of four scans, an object having a simple surface, e.g., a delineator being located in the visual range of a pulse-echo sensor.

FIG. 2 shows a sequence of four scans (scans 31 through 34), an object having a simple surface, e.g., a delineator, being located in the visual range of sensors 2 in front of vehicle 1. As the scans show, the pulse length scarcely varies. The number of pulses is constant=1. From these signal characteristics, it may be inferred that the detected object has a simple surface, e.g., cylindrical, spherical, ellipsoid-shaped or the like. From this, in turn, object 5 may be classified to differentiate it from a person.

Figure 3:
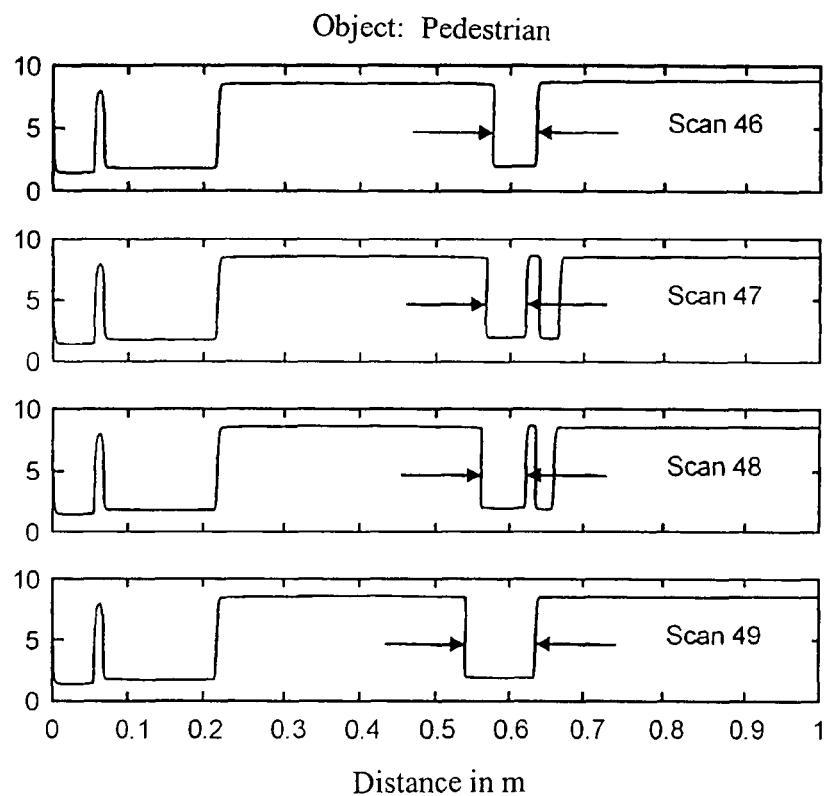
FIG. 3 shows a sequence of four scans, a person being located in the visual range of the pulse-echo sensor.

In contrast, in the case of the four scans (scans 46 through 49) shown in FIG. 3, a person 7, e.g., a pedestrian who naturally has a complex "surface", is located in front of the vehicle. In this context, scans 46 through 49 shown were based on the same boundary conditions, in particular the same rate of repetition as for scans 31 through 34 shown in FIG. 2. The pulse lengths as well as the number of pulses vary considerably in a brief time in the case of these scans. From these signal characteristics, a complex surface is inferred as exists, for example, for a person. The "object" in front of sensors 2 is therefore classified as person 7. Namely, a complex surface already generates sharp deviations from echo pulse to echo pulse in response to the slightest movements relative to sensors 2. A complex surface may be made up of a few or many small facets, each having a small backscatter cross-section, or a plurality of microreflectors, each having a negligible small backscatter cross-section, or also a combination of both.

The present invention uses the correlation between the surface roughness and the backscatter behavior. It evaluates the stochastic fluctuations of the reflected echo pulses, and in this way classifies the reflector type for each travel-time/distance measurement of the sensor-reflector-receiver path in a sensor array, thus separately for each auto echo and cross echo.

The advantage in this connection is the very inexpensive execution using ultrasonic sensors. The pulses may also be evaluated using only relatively small technical expenditure. Moreover, information may be obtained about the reflector type for each pulse-echo distance measurement per triple transmitter-reflector-receiver.

This facilitates the assignment of the echoes to the internal objects (tracks) created in the evaluation unit, especially for the case when more than one object or one person is in the detecting range of sensors 2.

Furthermore, the attribute "reflector type" facilitates the assignment of objects, created internally in the evaluation unit, of different channels (channel 1: sensor 1 transmits, sensor 1 receives; channel 2: sensor 1 transmits, sensor 2 receives; channel 3: sensor 2 transmits, sensor 1 receives; channel 4: sensor 1 transmits, sensor 3 receives, etc.) to one another, especially for the fusion of data with respect to 2D or 3D objects.

What is claimed is:

1. A method for detecting a surface character of an entity in road traffic positioned in front of a vehicle, the method comprising:
   emitting signals from the vehicle, the emitted signals being transmit pulses that are reflected by the entity to produce echo pulses as reflected signals;
   receiving and evaluating the reflected signals in the vehicle;
   inferring, based on the signal characteristics of the echo pulses, a surface character including a surface roughness of the entity; and
   inferring whether the entity is a person or an object other than a person based on the inferred surface character including the surface roughness.

2. The method of claim 1, wherein the surface character is inferred based on at least one of the following signal characteristics:
   a pulse length of a received echo pulse;
   an average pulse length of a specifiable number of previous echo pulses from the same entity;
   a fluctuation of the pulse length of a specifiable number of previous echo pulses from the same entity;
   a number of echo pulses within a specifiable time interval beginning from the first echo pulse received; and
   a change of a signal shape as a function of the specific distance of the entity from the vehicle.

3. The method of claim 2, wherein the signals are ultrasonic signals, and wherein at least one of operating dynamics of the vehicle and a triggering of protective devices are adjusted.

4. The method of claim 1, wherein the signals are ultrasonic signals.

5. The method of claim 1, wherein at least one of operating dynamics of the vehicle and a triggering of protective devices are adjusted.

6. The method of claim 1, wherein the surface character is inferred based on a pulse length of a received echo pulse.

7. The method of claim 1, wherein the surface character is inferred based on an average pulse length of a specifiable number of previous echo pulses from the same entity.

8. The method of claim 1, wherein the surface character is inferred based on a fluctuation of the pulse length of a specifiable number of previous echo pulses from the same entity.

9. The method of claim 1, wherein the surface character is inferred based on a change of a signal shape as a function of the specific distance of the same entity.

10. A device for determining a surface character of an entity in road traffic in front of a vehicle, comprising:
   pulse-echo sensors for emitting and receiving signals;
   at least one signal-analysis device for determining and evaluating signal characteristics of echo pulses reflected by the entity; and
   at least one control device for triggering at least one of an operating-dynamics system, an occupant protective device, and a pedestrian protective device as a function of the signal characteristics;
   wherein the emitted signals are transmit pulses whose echo pulses are received, and based on the signal characteristics of the echo pulses, the surface character, including a surface roughness, of the entity is inferred, and it is inferred whether the entity is a person or an object other than a person based on the inferred surface character, including the surface roughness.

11. The device of claim 10, wherein the pulse-echo sensors are ultrasonic sensors.

12. The device of claim 11, wherein the ultrasonic sensors are part of an ultrasonic-sensor array of a proximity warning system.

13. The device of claim 10, wherein the surface character is inferred based on at least one of the following signal characteristics:
   a pulse length of a received echo pulse;
   an average pulse length of a specifiable number of previous echo pulses from the same entity;
   a fluctuation of the pulse length of a specifiable number of previous echo pulses from the same entity;
   a number of echo pulses within a specifiable time interval beginning from the first echo pulse received; and
   a change of a signal shape as a function of the specific distance of the entity from the vehicle.

14. The device of claim 10, wherein the signals are ultrasonic signals.

15. The device of claim 10, wherein at least one of operating dynamics of the vehicle and the triggering of the protective devices are adjusted.

16. The device of claim 10, wherein the signals are ultrasonic signals, and wherein at least one of operating dynamics of the vehicle and the triggering of the protective devices are adjusted.

17. The device of claim 10, wherein the surface character is inferred based on a pulse length of a received echo pulse.

18. The device of claim 10, wherein the surface character is inferred based on an average pulse length of a specifiable number of previous echo pulses from the same entity.

19. The device of claim 10, wherein the surface character is inferred based on a fluctuation of the pulse length of a specifiable number of previous echo pulses from the same entity.

20. The device of claim 10, wherein the surface character is inferred based on a change of a signal shape as a function of the specific distance of the same entity.

* * * * *

UNITED STATES PATENT AND TRADEMARK OFFICE
CERTIFICATE OF CORRECTION

PATENT NO. : 8,432,770 B2  
APPLICATION NO. : 11/918848  
DATED : April 30, 2013  
INVENTOR(S) : Zott et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1081 days.

Signed and Sealed this
Eighth Day of September, 2015

Michelle K. Lee
*Director of the United States Patent and Trademark Office*